US005701278A

United States Patent [19]

Higuchi et al.

[11] Patent Number: 5,701,278

[45] Date of Patent: Dec. 23, 1997

[54] POWER SUPPLY UNIT FOR ELECTRONIC APPLIANCES

[75] Inventors: Haruhiko Higuchi; Kenji Miyasaka; Norio Miyauchi, all of Tanashi, Japan

[73] Assignee: Citizen Watch Co., Ltd., Tokyo, Japan

[21] Appl. No.: 553,424

[22] PCT Filed: Mar. 28, 1995

[86] PCT No.: PCT/JP95/00578

§ 371 Date: Nov. 28, 1995

§ 102(e) Date: Nov. 28, 1995

[87] PCT Pub. No.: WO95/26520

PCT Pub. Date: Oct. 5, 1995

[30] Foreign Application Priority Data

Mar. 29, 1994 [JP] Japan .................................... 6-58419

[51] Int. Cl.$^6$ .................................. G04B 1/00; H02J 7/00

[52] U.S. Cl. ............................. 368/204; 368/204; 320/1; 320/16

[58] Field of Search .................................... 368/203–205; 320/1, 6–8, 14, 17, 27

[56] References Cited

U.S. PATENT DOCUMENTS

| | | | |
|---|---|---|---|
| 4,667,142 | 5/1987 | Butler | 320/16 |
| 4,709,200 | 11/1987 | Ochiai | 368/205 |
| 4,785,435 | 11/1988 | Inoue et al. | 368/205 |
| 5,001,685 | 3/1991 | Hayakawa | 368/204 |

FOREIGN PATENT DOCUMENTS

| | | |
|---|---|---|
| 61-63190 | 4/1986 | Japan . |
| 61-204355 | 12/1986 | Japan . |
| 61-280595 | 12/1986 | Japan . |
| 62-134088 | 8/1987 | Japan . |
| 62-174295 | 11/1987 | Japan . |
| 63-128286 | 5/1988 | Japan . |
| 3-160394 | 7/1991 | Japan . |
| 3-88189 | 9/1991 | Japan . |

*Primary Examiner*—Bernard Roskoski
*Attorney, Agent, or Firm*—Kanesaka & Takeuchi

[57] ABSTRACT

A power supply unit having a power generation portion 1 and a power storage portion 4 to supply power to an electronic watch 3. The power storage portion is formed by a plurality of cells 41, 42, each having the same capacity and having switches 51, 52 connected in series, a switch 53 is connected in series between the plurality of cells 41, 42, and these switches 51, 52, and 53 are switched by signals from a voltage detector circuit 6. This arrangement reduces initial actuation time and expands the time for which the electronic appliance continues to operate.

10 Claims, 13 Drawing Sheets

POWER SUPPLY UNIT FOR ELECTRONIC APPLIANCES

FIELD OF THE INVENTION

The present invention relates to a power supply unit having a power generation portion and a power storage portion, and , more particularly, to a power supply unit for electronic appliances which can accumulate electricity up to the minimum actuation voltage at the initial operation or the like in a short period of time without reducing the storage capacity.

DESCRIPTION OF THE PRIOR ART

Replacement of cells is unavoidable for electronic appliances powered by cells when the cells are dead. This is an important subject in the operation of electronic appliances, because cells may not be available when the replacement is needed, and cell replacement is a time-consuming job and involves disadvantage in terms of cost.

A method which has been proposed to solve this subject is to provide a power generation portion and a power storage portion (a second battery) in an electronic appliance to accumulate electric charge generated by the power generation portion in the power storage portion and to drive the electronic appliance by the electric charge accumulated in the power storage portion. By means of this method the electronic appliance can operate while the electric charge is being accumulated in the power storage portion, and when the electric charge has been consumed the electricity is generated by the power generation section and accumulated in the power storage portion, thereby bringing the electronic appliance to the operating conditions again. Electronic appliances can be operated semi-permanently without replacing cells by means of this method.

FIG. 15 is a block diagram of a conventional power supply unit equipped with a power generation portion and a power storage portion. In this Figure, 1 indicates a power generation portion; 2, a diode; 3, an electronic appliance; and 4, a power storage portion. The electric charge generated in the power generation portion 1 is accumulated in the power storage portion 4 by means of the diode 2. The electronic appliance 3 is driven by the electric charge accumulated in the power storage portion 4. The diode 2 has a function of preventing a reverse flow of electricity, whereby the electric charge accumulated in the power storage portion 4 is prevented from being discharged to the power generation portion 1 side when the power supply from the power generation portion 1 is halted and the power voltage is zero or when the power voltage is lower than the terminal voltage of the power storage portion 4 even while the power is being generated.

In the power supply unit shown in FIG. 15, a large capacity condenser which can accumulate a large amount of electric charge is advantageous as the power storage portion 4 in order to keep the electronic appliance to operate for a long period of time while electricity is not generated by the power generation portion 1. However, in the case where no electric charge is accumulated in the power storage portion 4, such as the case where the electronic appliance is in the initial conditions or the electronic appliance has not been used for a long period of time, it takes a long time after electric generation is started in the power generation portion 1 for the both-side voltage of the capacity of power storage portion 4 to reach a minimum actuation voltage which is the minimum voltage required for he electronic appliance to be operated because of the large capacity of the power storage portion 4. This means a long initial actuation time which is the time required for the electronic appliance 3 to be operated after the commencement of power generation, and is not desirable for the users.

A small capacity for the power storage portion 4 is advantageous from the aspect of improving the actuation time. However, the period for which the electronic appliance is operated becomes short under the conditions where the power generation portion 1 does not generate electric power if the condenser capacity is small. Therefore, the power supply unit which has only one power storage portion 4 as shown in FIG. 15 is not practical.

Accordingly, a power supply unit capable of reducing the actuation time while maintaining a long operation hour, as shown in Japanese Patent Application Laid-open No. 236326/1986, has been proposed, and electronic appliances exhibiting both a short actuation time and a long operating hour have been developed.

This power supply unit has two condensers, one having a small capacity and the other a large capacity, as a power storage portion. The electric charge generated by the power generation portion is accumulated with preference in the condenser having a small capacity to start operation of the electronic appliance, while the condenser having a large capacity is gradually charged. After a certain amount of electric charge has been accumulated in the large capacity condenser after the start, the voltage of the large capacity condenser is increased to a level sufficient to operate the electronic appliance by a step-up circuit, thereby running the electronic appliance by the large capacity condenser.

It is possible to reduce the actuation time while using power storage portion with a large capacity by means of this power supply unit. In addition, even after the voltage of power storage portion with a large capacity has been decreased to a level lower than that required to drive the electronic appliance while using the electronic appliance, it is possible to use out the electric charge accumulated in the power storage portion with a large capacity by driving the electronic appliance by the increased voltage of that power storage portion with a large capacity. Accordingly, it is possible to increase the operation hour of the electronic appliance at the same time.

The power supply unit as shown in the Japanese Patent Application Laid-open No. 236326/1986, however, requires a step-up circuit within the unit, which makes the circuit construction complicated. In addition, a plurality of external parts for the step-up circuit, such as condensers and coils, are necessary. This makes the physical size of the electronic appliance large, resulting in reduction of the value of this unit in applying to a small size, portable electronic equipment, particularly the equipment such as wrist watches, in which it is necessary to house all system within a limited volume. Furthermore, the use of the step-up circuit requires electric power consumed by the step-up circuit itself, giving rise to a reduced operating hour of the electronic equipment.

Accordingly, an object of the present invention is to provide a power supply unit for electronic appliances capable of accumulating electric charge in a large capacity and, at the same time, enabling the electronic appliance to actuate within a short period of time without using a step-up circuit.

Another object of the present invention is to provide a small size power supply unit for electronic appliances, wherein miniaturization of the power supply unit itself ensures miniaturization of the electronic appliance in which this power supply unit is used.

DISCLOSURE OF THE INVENTION

The power storage portion in the power supply unit of the present invention consists of a plurality of power storage portions having the same capacity. This ensures to reduce the initial actuation time or the like and, at the same time, makes it possible to apply this power supply unit to electronic appliances requiring a large accumulation capacity.

In addition, the power supply unit of the present invention can switch the mode of connection to the plurality of power storage portions either to a parallel connection or a series connection by a switch. This also reduces the actuation time and the like.

Furthermore, the power generation portion of the present invention employs a dynamo which is equipped with a means for preventing generation of a high voltage. This prevents generation of a high voltage in the generator even in the case of a rapid rotation of the rotational weight, thereby preventing a risk of breakage of the power supply unit by a high voltage.

DETAILED DESCRIPTION OF THE PREFERRED EMBODIMENTS

The present invention will be illustrated in more detail with reference to the drawings.

Figure 1:
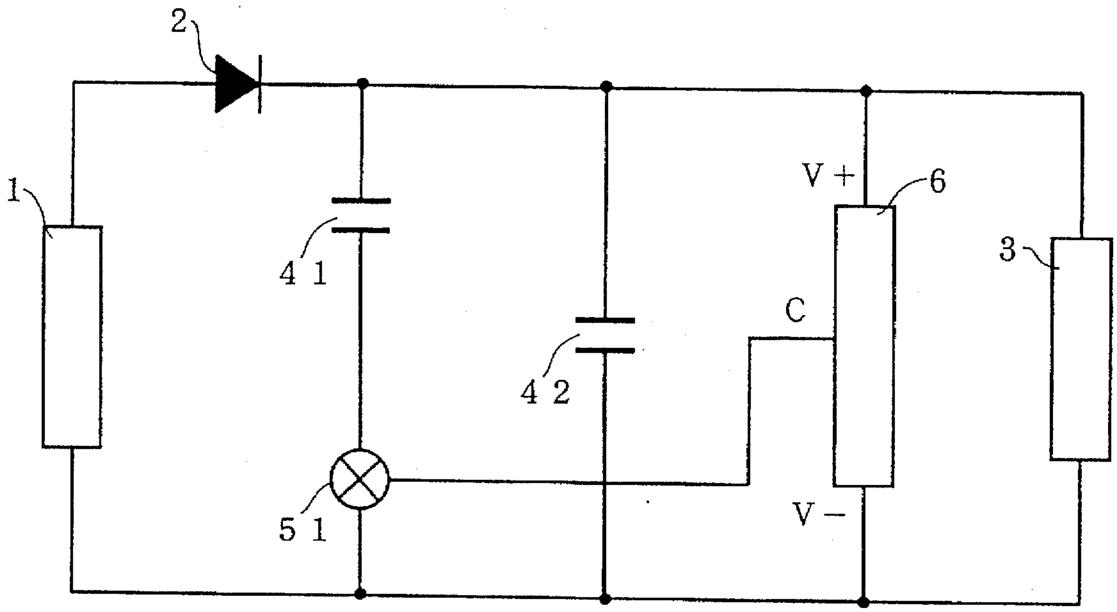
FIG. 1 is a block diagram illustrating the structure of a first embodiment of the power supply unit for electronic appliances of the present invention.

FIG. 1 is a block diagram illustrating the structure of a first embodiment of the present invention.

The power supply unit of this first embodiment has a power generation portion 1 and a diode 2 and is served for supplying electric power to an electronic appliance such as, for example, a wrist watch or the like. This power supply unit is provided with an electronic appliance 3 and cells 41, 42, each consisting of two condensers arranged in parallel. In this embodiment the two cells 41, 42 which consist of the power storage portions have the same capacity. Connected to the power supply unit is a switch 51 consisting of a transistor and the like and arranged in series to the cell 41. This switch 51 is operated by signals from a voltage detector circuit 6 which is connected in parallel to the two cells 41, 42 having the same capacity.

This voltage detector circuit 6 is designed to indicate "L" as output C when the cells 41, 42 have no electric charge. The switch 51 is in an "OFF" state when the output C for the voltage detector circuit 6 is "L". Accordingly, the electric charge produced in the power generation portion, 1 is charged only to the cell 42 through the diode 2. The electronic appliance is operated when the cell 42 is charged and the terminal voltage between the terminals of the cell 42, that is, the V+ and V− of the voltage detector circuit 6, reaches the minimum voltage Vmin to drive the electronic appliance.

The voltage detector circuit 6 switches the output C to "H" when the terminal voltage of the cell 42 is twice the minimum voltage Vmin and turns "ON" the switch 51. When the switch 51 is "ON", the cell 41 and the cell 42 are brought into parallel. Further, when the switch 51 is "ON", the electric charge is transferred from the cell 42 to the cell 41, decreasing the terminal voltage of the cell 42. Neither of the terminal voltage of the cell 41 or the terminal voltage cell 42 is reduced to a level smaller than the minimum voltage Vmin. The electronic appliance 3 is therefore kept to be operated.

Figure 15:
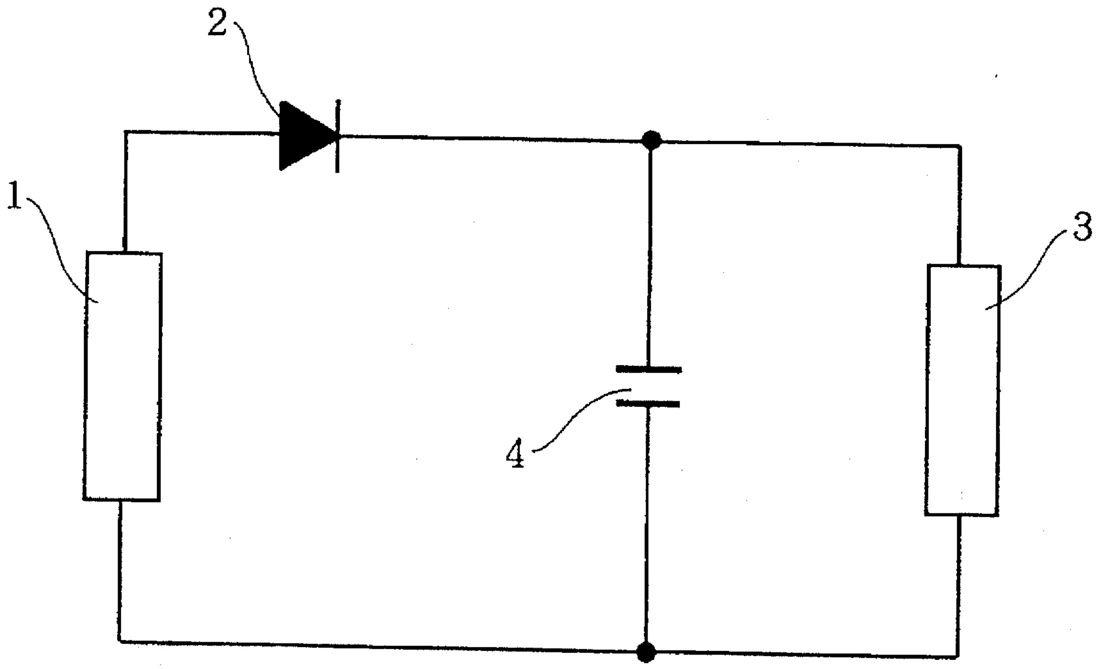
Fig. 15 Prior Art
FIG. 15 is a block diagram illustrating the structure of a conventional power supply unit for electronic appliances.

In the conventional power supply unit shown in FIG. 15, when the power storage portion 4 is a condenser with a capacity of C [F] and the minimum voltage to actuate the electronic appliance 3 is Vmin, the electric charge Q required to actuate the electronic appliance 3 is represented by the following formula (1).

$$Q = C \times Vmin\ [C] \quad (1)$$

When the capacity of each of the cells 41 and 42 in the first embodiment is 0.5C [F], the electric charge Q' required to actuate the electronic appliance 3 is calculated from the formula (1) as follows.

$$\begin{aligned} Q' &= 0.5C \times Vmin \\ &= 0.5 \times Q\ [C] \end{aligned} \quad (2)$$

Accordingly, if the conventional power supply unit and the power supply unit of the first embodiment have a power generation portion 1 with the same capacity, the time required to actuate the electronic appliance 3 by the power supply unit of the present invention is ½ of the time required by the conventional power supply unit. After the cells 41 and 42 are connected in parallel, the effective capacity of the power storage portion in which the cells are connected in parallel is C [F], which is the same as the accumulating capacity as that in the conventional power supply unit. Therefore, the characteristics of the long operating hour are not impaired.

Figure 2:
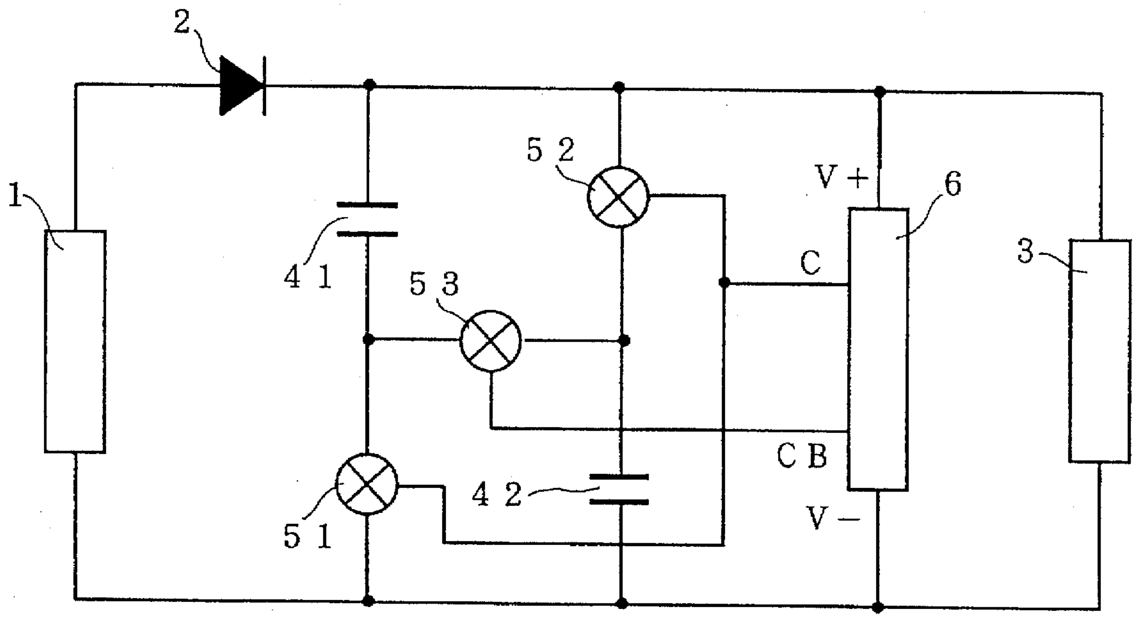
FIG. 2 is a block diagram illustrating the structure of a second embodiment of the power supply unit for electronic appliances of the present invention.

FIG. 2 is a block diagram illustrating the structure of a second embodiment of the present invention. The power supply unit of this second embodiment have a structure with switches 52, 53 added to the power supply unit of the first embodiment. Specifically, the power supply unit has a switch 51 connected in series between the cell 41 and the negative (−) side of the power generation portion 1, a switch 52 connected in series between the cell 42 and the plus (+) side of the power generation portion 1, and a switch 53 connected between the junction of the cell 41 and the switch 51 and the junction of the cell 42 and the switch 52.

The switches 51 and 52 are "OFF" when the output C of the voltage detector circuit 6 is "H", and the switch 53 is "ON" when the output CB of the voltage detector circuit 6 is "L".

Further, the voltage detector circuit 6 is set so that when the voltage between the V+ terminal and the V− terminal is smaller than the minimum actuation voltage Vmin of the electronic appliance 3, the output C is "H" and the output CB is "L".

Accordingly, in the initial condition starting from the time when no electric charge is accumulated in the cells 41 and 42, through generation of electricity by the power generation portion 1, up until the time when the voltage between the V+ terminal and the V− terminal of the voltage detector circuit 6 is brought to the minimum actuation voltage Vmin of the electronic appliance 3, the switch 51 and the switch 52 are kept "OFF", the switch 53 is kept "ON", and the cells 41 and 42 are connected in series.

When electric charge is generated by the power generation portion 1 and accumulated in the cells 41 and 42 to raise the voltage of the both terminals, the terminal voltage of the voltage detector circuit 6 is brought to Vmin. When the sum of the terminal voltages of the cells 41 and 42 is the minimum actuation voltage Vmin in this manner, operation of the electronic appliance 3 is initiated.

Because the cell 41 and the cell 42 have the same capacity when the cells 41 and 42 are connected in series as mentioned above, the terminal voltage of these cells is the same and equivalent to ½ of the voltage between the V+ and V− terminals of the voltage detector circuit 6. Accordingly, the terminal voltage for the both cells 41 and 42 when the electronic appliance 3 is brought to operation is ½ of the minimum actuation voltage Vmin.

When electricity is continued to be generated by the power generation portion 1, the terminal voltage of the cells 41 and 42 further increases. When the voltage detector circuit 6 detects that the sum of the terminal voltage of the cells 41 and 42, that is, the terminal voltage between the V+ and V− terminals of the voltage detector circuit 6, exceeds twice the minimum actuation voltage vmin, the output C of voltage detector circuit 6 becomes "L", and the output CB "H". The switches 51 and 52 are thereby brought to "ON" and the switch 53 is brought to "OFF". Then, the cells 41 and 42 are connected in parallel to the power generation portion 1.

Immediately before the cells 41 and 42 are switched from series to parallel, the both terminal voltages of the cells 41 and 42 are at least Vmin. Accordingly, the terminal voltage between the V+ and V− terminals of the voltage detector circuit 6 is not smaller than Vmin at the time immediately after the cells 41 and 42 are connected in parallel. The operation of the electronic appliance is thereby maintained.

In the same manner as in the first embodiment, if the capacity of the cells (condensers) 41 and 42 for this second embodiment is half of the capacity of the condenser in the conventional power supply unit, that is, 0.5C [F], the effective capacity of each of the cells 41 and 42 is 0.25C [F], because the cells 41 and 42 are connected in series. Accordingly, the electric charge Q" required for bringing the electronic appliance 3 into actuation is as indicated by the formula (3).

$$Q'' = 0.25C \times Vmin = 0.25 \times Q\,[C] \quad (3)$$

Accordingly, if the capacity of the power generation portion 1 is the same as that of the conventional power supply unit, the time required for actuating the electronic appliance 3 by this power supply unit is ¼ of the time required by the conventional power supply unit.

After termination of power generation by the power generation portion 1, the electronic appliance 3 continues to be operated by consuming the electric charge accumulated in cells 41 and 42. The both terminal voltages of the cells 41 and 42 thereby continue to be decreased. If the electronic appliance 3 continues to be operated without power supply from the power generation portion 1, the both terminal voltages of the cells 41 and 42 reach the minimum actuation voltage Vmin of the electronic appliance 3. When the terminal voltages of the cells 41 and 42, that is, the terminal voltage between the V+ and V− terminals of the voltage detector circuit 6, are smaller than Vmin, the output C of voltage detector circuit 6 becomes "H", and the output CB "L".

The switches 51 and 52 are thereby brought to "OFF" and the switch 53 is brought to "ON". Then, the cells 41 and 42 are connected in series to the power generation portion 1.

Immediately before the cells 41 and 42 are switched from parallel to series, the both terminal voltages of the cells 41 and 42 are almost Vmin. Accordingly, the terminal voltage between the V+ and V− terminals of the voltage detector circuit 6 is twice the Vmin at the time immediately after the cells 41 and 42 are switched to series. Therefore, operation of the electronic appliance 3 is maintained even if the electric charge of the cells 41 and 42 is consumed and the terminal voltage of the cells 41 and 42 is further reduced. The electronic appliance 3 continues to be operated under the conditions wherein the cells 41 and 42 are connected in series until the terminal voltage between the V+ and V− terminals of the voltage detector circuit 6 is smaller than Vmin.

At this time, the terminal voltage of the cells and 42 is ½ the Vmin. In other words, the electronic appliance 3 can be operated until the time when the terminal voltages of the cells 41 and 42 are reduced to ½ the minimum actuation voltage Vmin. Accordingly, the power supply unit of the second embodiment can operate the electronic appliance 3 longer than the conventional power supply unit.

In this manner, the power supply units for electronic appliances of the first and second embodiments make it possible to reduce the time for the initial actuation and to expand the time for which the electronic appliances continue to operate by merely adding a switch and a voltage detector circuit without requiring a step-up circuit. In addition, because the electricity otherwise consumed by the step-up circuit can be supplied to the electronic appliances, the time for which the electronic appliances continue to operate can be extended even longer. Furthermore, because the switch and the voltage detector circuit can be enclosed in the IC, the number of the parts can be reduced and the system can be significantly miniaturized.

It is obvious that the circuit for the power supply units of the first and second embodiments may be easily constructed to have two or more cells and switches.

Figure 3:
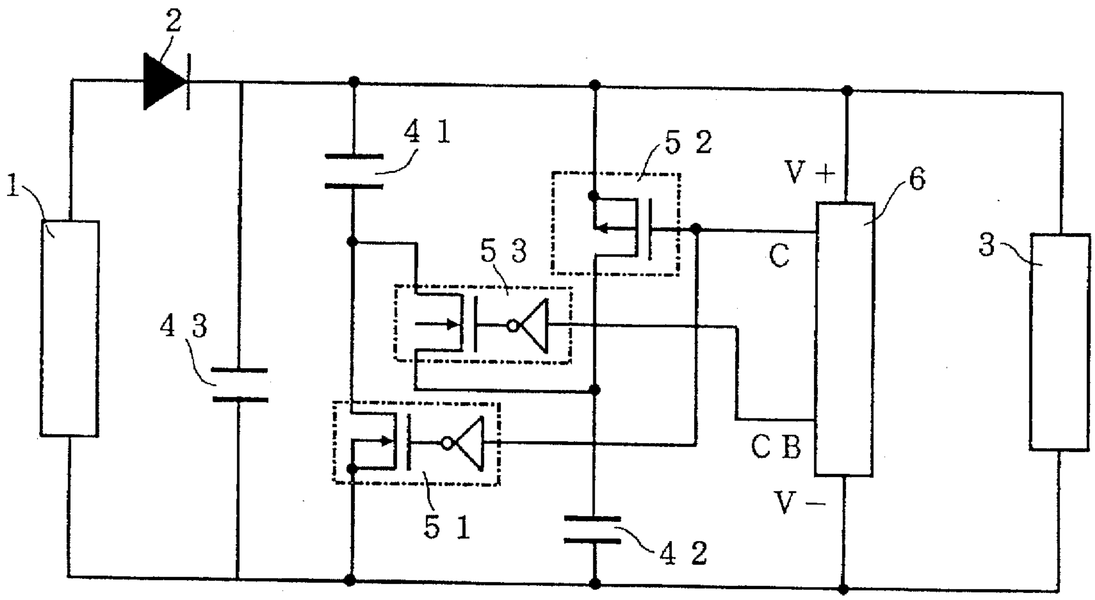
FIG. 3 is a block diagram illustrating the structure of a third embodiment of the power supply unit for electronic appliances of the present invention.

FIG. 3 is a block diagram showing the structure of a third embodiment of the present invention.

The power supply unit of this third embodiment has a structure with a small capacity cell 43 added to the power supply unit of the second embodiment. Specifically, the small capacity cell 43 is placed parallel to the electronic appliance 3 and connected independently to the cells 41, 42, and switches 51, 52, 53. In this instance, a cell with a smaller capacity than those of the cells 41 and 42 is used as the cell 43.

An MOS transistor actuated at a high speed with a small power consumption is usually used as the switches for the power supply unit in the second embodiment. The use of an MOS transistor for the switch 53 involves the following phenomenon. That is, when the cells 41 and 42 are in series (when the switches 51, 52 are "OFF" and the switch 53 is "ON") and the voltage between V+ and V− of the voltage detector circuit 6 is low, the ON resistance for the switch 53 is large.

This is because that the potential of the source and drain of the switch 53 is around the middle of V+ and V− when the cells 41 and 42 are in series and a high gate voltage cannot be secured because of the V+ gate voltage, so that the ON resistance for the switch 53 is large. The current flows only with difficulty to the cells 41 and 42 if the ON resistance for the switch 53 is large.

In contrast, if the cell 43 is connected as shown in FIG. 3, the current generated in the power generation portion 1 flows preferentially to the low impedance cell 43, thereby increasing the potential difference between V+ and V− of the voltage detector circuit 6. As a result, the switch 53 is rapidly turned ON permitting the power generated in the power generation portion 1 to flow to the cells 41, 42 and the power is smoothly accumulated.

In addition, the provision of the cell alleviates and absorbs the instantaneous sudden voltage change when the cells 41 and 42 are switched.

Furthermore, when the voltage difference between V+ and V− of the voltage detector circuit 6 is small, the power supply unit impedance for the electronic appliance 3 is large because of the large ON resistances of the switches 51, 52, and 53. The voltage decline between V+ and V− of the voltage detector circuit 6 can be prevented by providing the cell 43 to discharge electricity when the power consumption of the electronic appliance 3 is instantaneously increased due to fluctuations of load and the like.

Figure 4:
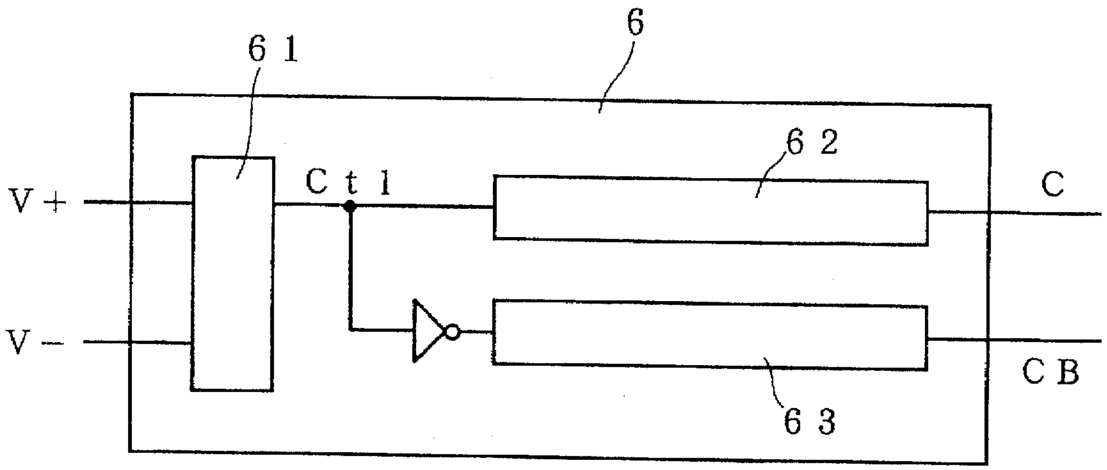
FIG. 4 is a block diagram illustrating the structure of a fourth embodiment of the power supply unit of the present invention.

FIG. 4 is a fourth embodiment of the present invention, showing a block diagram of the voltage detector circuit of the third embodiment.

The power supply unit of this fourth embodiment has a voltage detector circuit 6 which is provided with a voltage detector section 61 and shut down delay circuits 62, 63 which delay the output signal Ct1 for the voltage detector section 61 and the shut down signals C, CB after an inversion output for a specified period of time Td. A timing is given where all of the switches 51, 52, and 53 are turned OFF by simultaneously bringing the output signals C, CB for the voltage detector circuit 6 to "H" level, thereby preventing shortage between V+ and V− due to instantaneous turning of all switches to ON when the cells 41 and 42 are switched from series to parallel or from parallel to series.

Although the cells 41 and 42 are separated from the electronic appliance 3 during the specified period Td, the power is supplied by the cell 43 during this period to ensure the operation of the electronic appliance 3.

Figure 5:
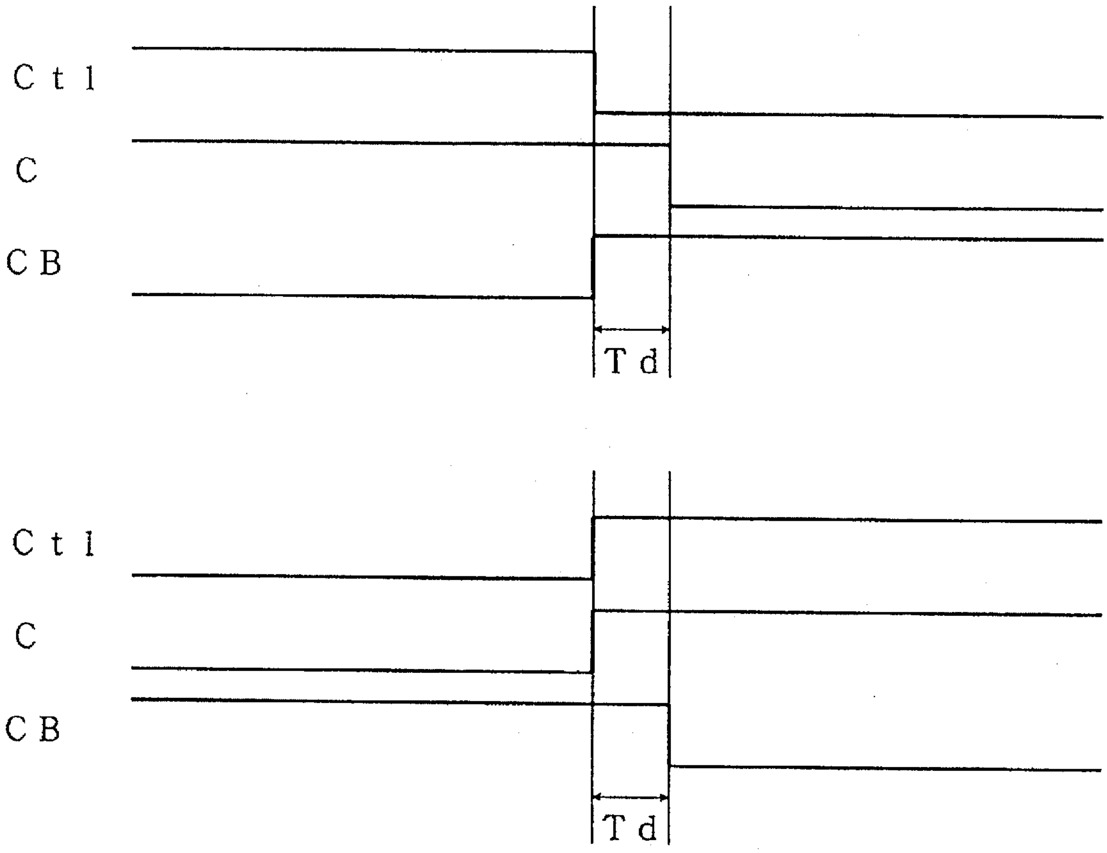
FIG. 5 is a time chart for signals in the voltage detector circuit shown in FIG. 4.

FIG. 5 is a timing chart showing the changes in the signals in this instance.

Figure 6:
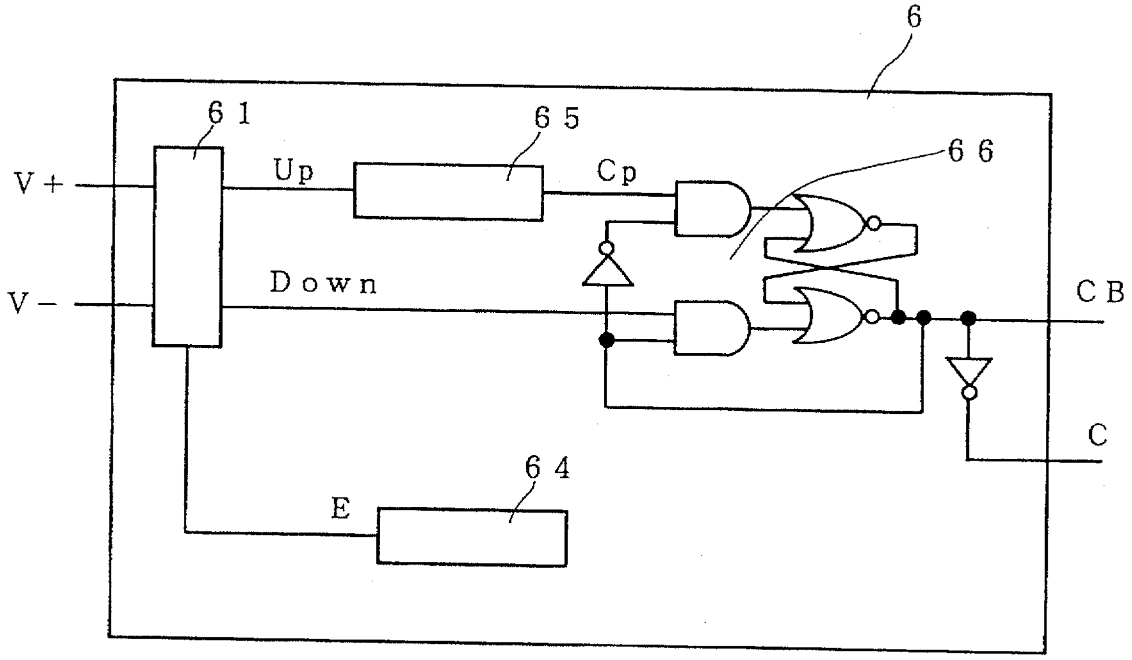
FIG. 6 is a block diagram of the voltage detector circuit which shows the structure of a fifth embodiment of the power supply unit for electronic appliances of the present invention.

FIG. 6 is a fifth embodiment of the present invention, showing a block diagram of the voltage detector circuit of the first to third embodiments.

The power supply unit of the fifth embodiment is provided with a voltage detector section 61, which consists of a timing circuit to differentiate the timing to detect the voltage in the voltage detector circuit in the voltage raising period and in the voltage decline period, a timer section 64, a counter section 65, and a flip-flop 66.

It is possible to use a combination of the fifth embodiment and the above-described fourth embodiment.

Figure 7:
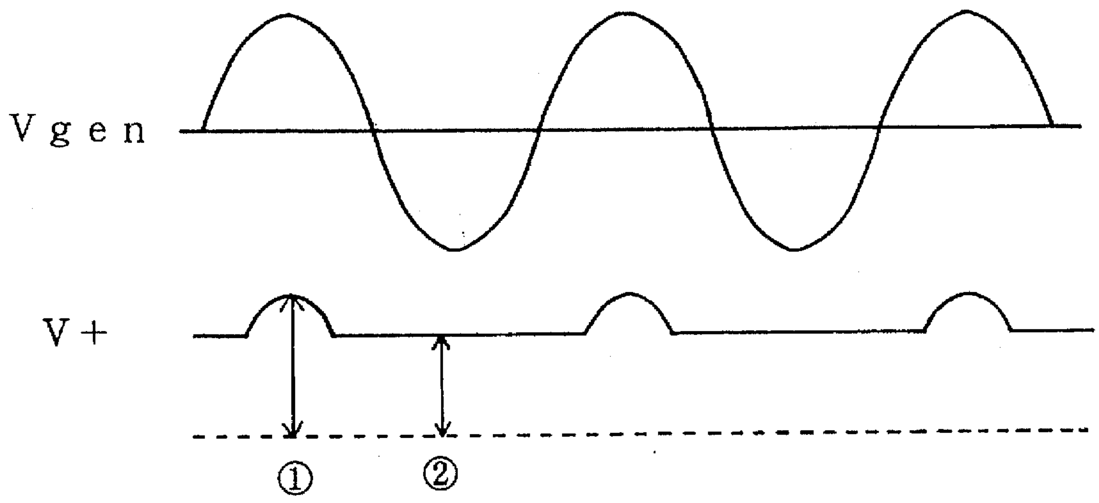
FIG. 7 is a drawing showing the conditions of generated voltage in the power generation portion.

In order to save the electricity consumption, the voltage detector circuit 6 intermittently detects the voltage by a timing signal E from the timer section 64. On the other hand, in the case where the power generation portion is a generator with a large voltage fluctuation in which electricity is generated by rotation of a rotating weight or by reciprocal energy, the voltage between V+ and V− of the voltage detector circuit 6 may rise instantaneously when the power is generated as shown in FIG. 7.

If the timing for intermittent voltage detection and the timing of an instantaneous rise of the voltage coincide, a high voltage is judged to have been detected even if the actual voltage is low. As a result, the cells 41, 42 may be switched from series connection to parallel connection.

Figure 8:
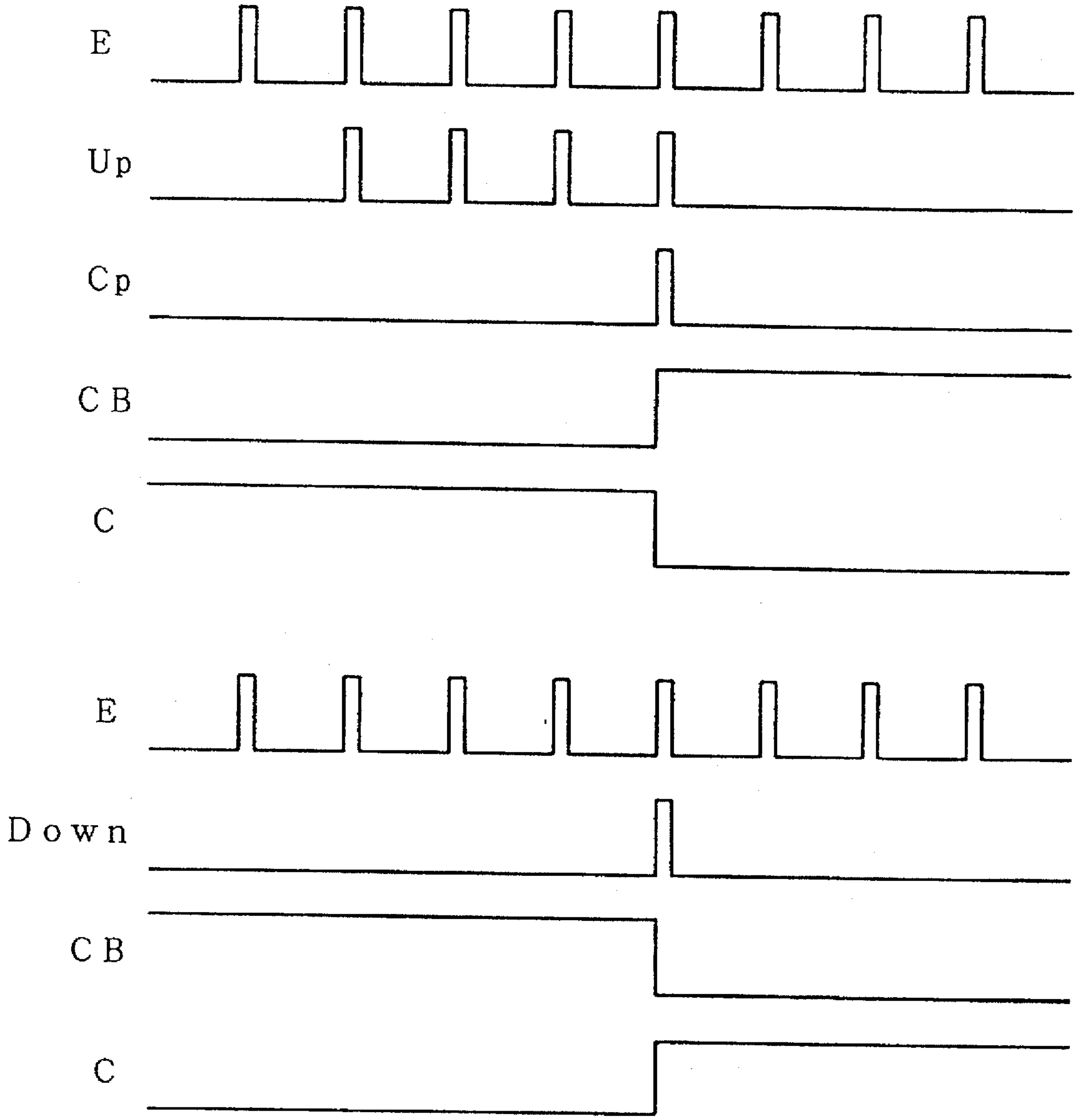
FIG. 8 is a time chart for signals in the voltage detector circuit shown in FIG. 6.

In order to prevent this malfunction, the voltage detector circuit 6 is constructed such that switching signals UP from the voltage detector section 61 is counted by a counter section 65 when a voltage higher than the standard voltage and an actual switching signal CP is given when the counter section 65 have counted several consecutive signals (four signals in FIG. 8). The flip-flop 66 gives an "H" level signal when the counter section inputs the switching signal CP.

The output C is thereby turned "L" and the output CB "H", to turn the switches 51, 52 "ON" and the switch 53 "OFF", whereby the cells 41 and 42 are switched from series to parallel.

On the other hand, when the voltage between V+ and V− of the voltage detector circuit 6 is decreased, a sudden decline of voltage is difficult to occur because a large fluctuation of load for the electronic appliance 3 is difficult to occur. Accordingly, an output of a switch signal Down from the voltage detector section 61 can cause the flip-flop section 66 to give out an "L" level signal without fail, thereby switching the cells 41 and 42 from parallel to series.

The power supply unit constructed in this manner is suitable for use in electronic watches and the like, especially in electronic wrist watches. An embodiment in which this power supply unit is assembled in an electronic wrist watch is therefore illustrated.

Figure 9:
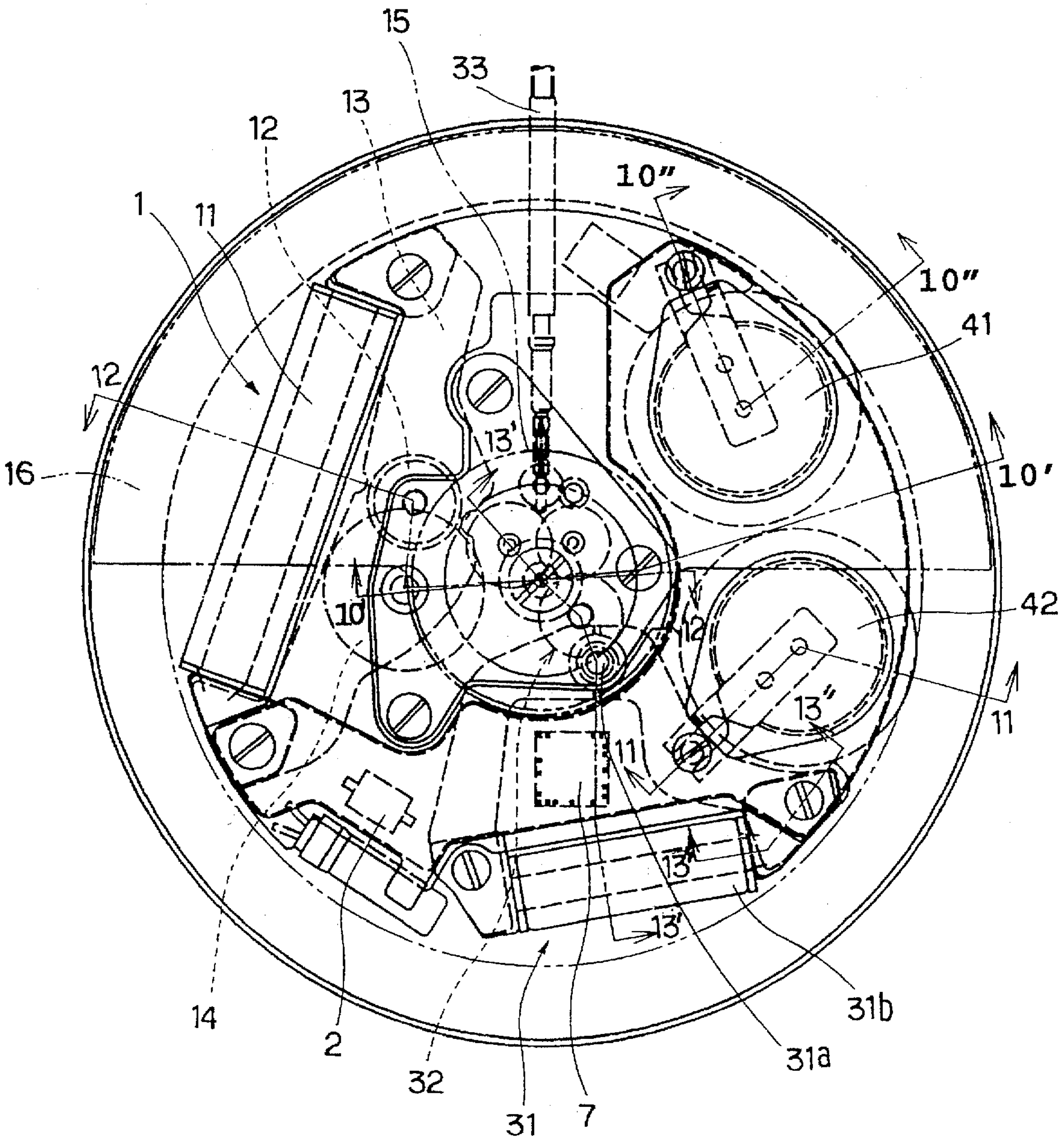
FIG. 9 is a plan view of a wrist watch in which the power supply unit for electronic appliances of the present invention has been assembled.
Figure 10:
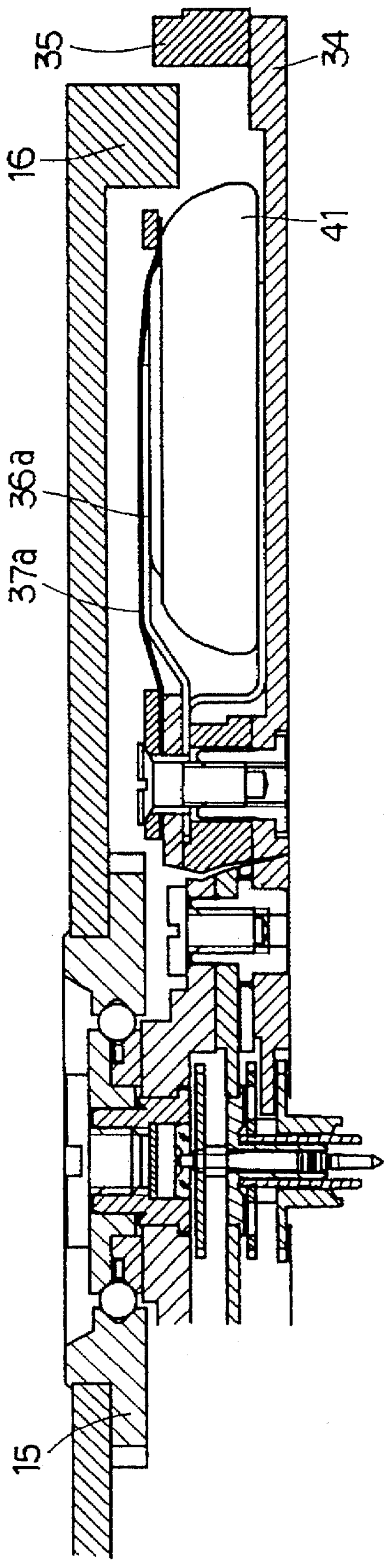
FIG. 10 is a combined sectional view along the section 10—10 and the section 10"—10" of FIG. 9.
Figure 11:
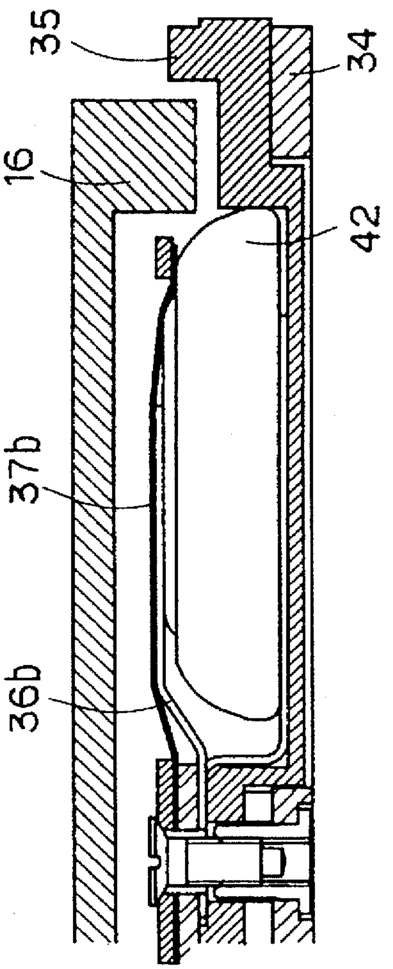
FIG. 11 is a sectional view along 11—11 of FIG. 9.
Figure 12:
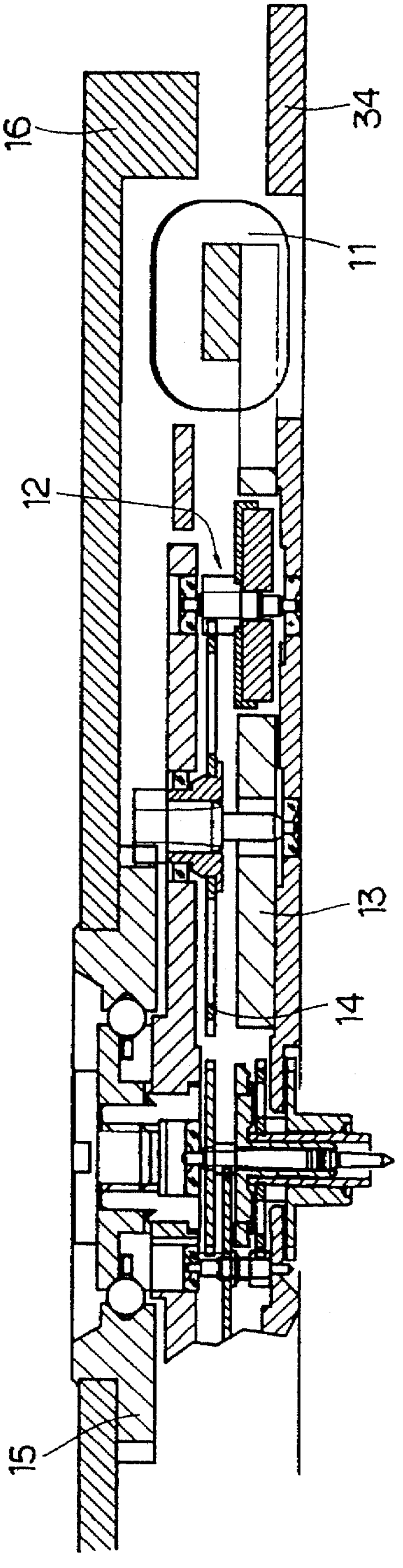
FIG. 12 is a sectional view along 12—12 of FIG. 9.
Figure 13:
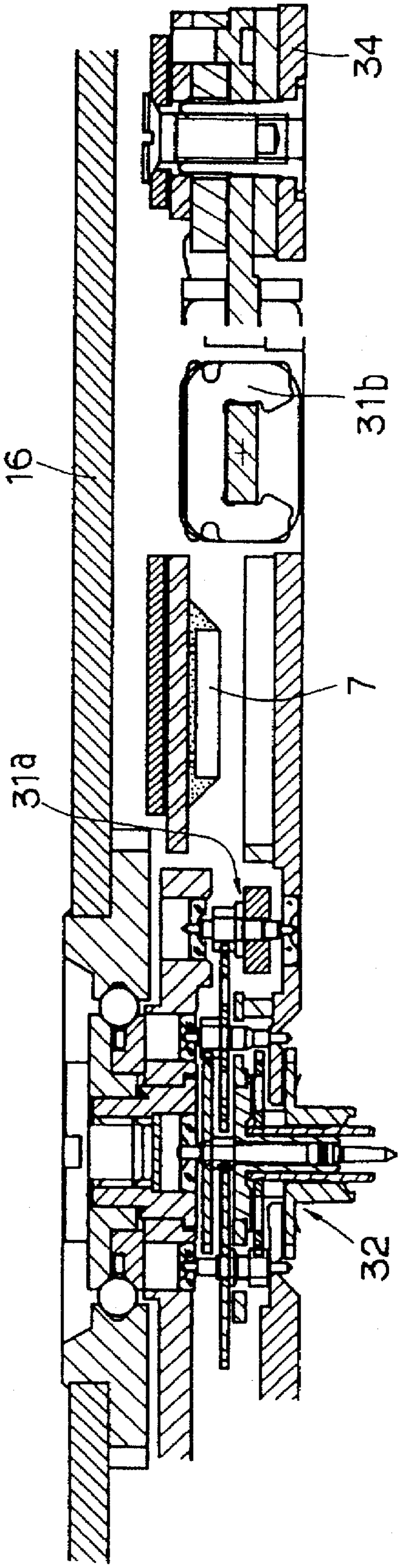
FIG. 13 is a combined sectional view along the section 13'—13' and the section 13"—13" of FIG. 9.

FIG. 9 is a plan view of an electronic wrist watch in which one of the power supply units from the first to five embodiments has been assembled; FIG. 10 is a combined sectional view along the section 10'—10' and the section 10"—10" of FIG. 9; FIG. 11 is a sectional view along 11—11; FIG. 12 is a sectional view along 12—12; and FIG. 13 is a combined sectional view along the section 13'—13' and the section 13"—13".

This electronic wrist watch is made up of a power generator 1 which converts a kinetic energy used as the power generation portion to an electric energy; cells 41, 42 which function as secondary cells; a motor 31 for hands driving which rotates by a power source from the cells 41, 42; a train wheel section 32 which transmits the rotation of the motor 31 to a time display section (not shown in the drawings); a winding stem 33 which switches the gear combination in the train wheel section 32 to perform time adjustment or the like of time hands; a wiring section for the power supply unit; switches 51, 52, 53; an IC chip 7 of the voltage detector circuit 6; and the like.

Here, the motor 31, the train wheel section 32, the winding stem 33, the time display section which is not shown in the drawings, and the like consist of the electronic appliance 3 in FIGS. 1–3.

The power generator 1 which is the power supply unit of the present invention is made up of a power generating coil block 11, a power generating rotor 12, a power generating stator 13, a power transmission wheel 14, a weight holder 15, a rotation weight 16, and the like. The kinetic energy by the rotation or the reciprocal movement of the rotation weight 16 is used via a power transmission wheel 14 to rotate the power generating stator 13 at a high speed, whereby the kinetic energy is converted to an electronic energy.

Figure 14A:
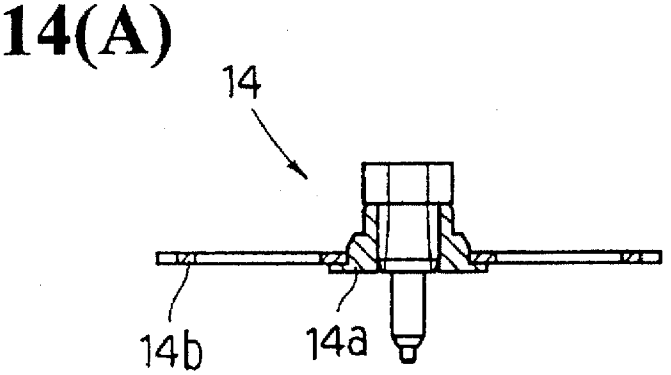
FIG. 14 (A) is a longitudinal sectional view of an example of a power transmission wheel, FIG. 14 (B) is a plan view of the power transmission wheel, and FIG. 14 (C) is a plan view of another power transmission wheel.
Figure 14B:
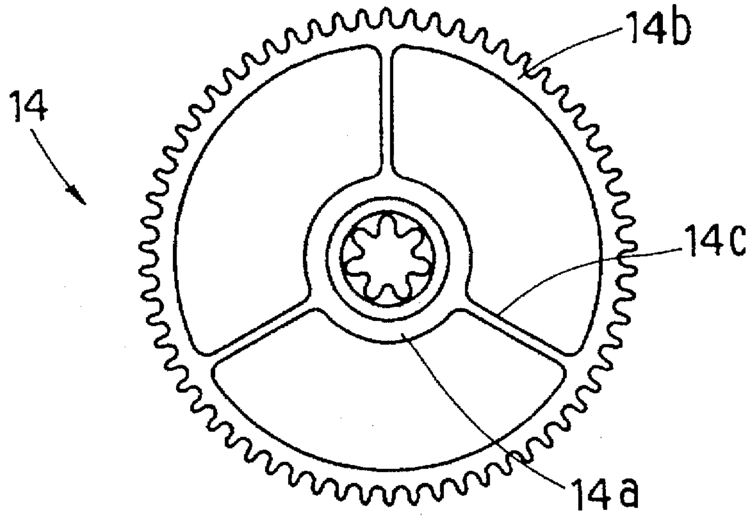
Figure 14C:
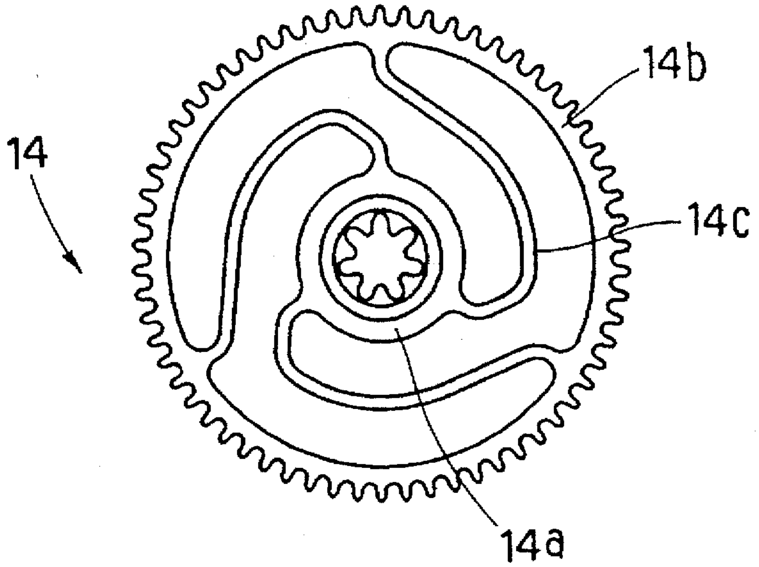

It is desirable that the power transmission wheel 14 elastically forms an arm 14*c* which joins a boss 14*a* and an outer peripheral gear 14*b*. To form the arm 14*c* elastically, the arm 14*c* should be made thin and small as shown in FIGS. 14(A) and 14(B), the number of arms should be reduced, and the power transmission wheel 14 itself should be made of an elastic material. It is also possible to have the arm 14*c* with a shape bending along the rotational direction of the power transmission wheel 14, as shown in FIG. 14(C).

If the arm 14*c* of the power transmission wheel 14 is elastic, part of the rotation energy created by sudden rotation of the rotation weight 16 for some reason can be absorbed by the deformation of the arm 14*c* between the boss 14*a* and the peripheral gear 14*b*.

Accordingly, a large rotational energy is not directly transferred to the power generating rotor 12, whereby generation of power with an abnormally high voltage is prevented, which not only protects each component in the power supply unit but also exhibits the effects of preventing breakage of wheel trains such as the power transmission wheel 14 and the like.

The cells 41 and 42, each having the same capacity and functioning as a secondary cell, may be condensers of the same shape as the compact, button-type batteries, shown in FIG. 9, having, for example, a diameter of 6.8 mm, a thickness of 1.4 mm, and a capacity of 0.1 F. Two cells 41 and 42 of this type are placed side by side in the same plane within the electronic wrist watch. Because the cells 41, 42, which are the thickest parts among all parts consisting of both the power supply unit and the wrist watch, can be housed in the wrist watch with the same height as the watch, it is possible to make thin both the power supply unit and the wrist watch.

Here, the cells 41, 42 having the same shape as the button-type battery are placed so that one side with a smaller diameter is positioned on the side of the rotation weight 16 (the side of a casing which is not shown in the drawings). Generally, button-type batteries have a large R-shape formed on the one side. Because of this, even if the cells 41, 42 are placed very close to the periphery of the wrist watch so that the thick periphery of the rotation weight 16 horizontally overlaps the cells 41, 42 when the rotation weight rotates, the cells 41, 42 will not interfere with the rotation due to the R-shaped configuration. The space within the wrist watch can be effectively utilized in this manner.

However, if the cells 41, 42 are placed with the negative (−) side facing upward, there may be the case where shortage occurs between the rotation weight 16 and the cells 41, 42, when a strong impact is given to the wrist watch. Because of this, in the power supply unit of the present invention the upper part of the negative (−) side leads 36*a*, 36*b* of the cells 41, 42 are covered by insulating sheets 37*a*, 37*b* to prevent shortage between the negative (−) side lead 36*a* of the cells 41, 42 and the rotation weight 16.

In addition, as shown in FIGS. 10 and 11, among the two cells 41, 42, the positive (+) side of the cell 41 is placed on a ground plate 34, with the other cell 42 being placed on a winding stem spacer 35 formed from an insulating material. By means of this arrangement of the cells 41 and 42 to avoid their direct electrical junction, the series-parallel switching of these cells by the switches 51, 52, 53 within the circuit can be ensured in the above-described second and third embodiments.

These two cells 41, 42 are arranged at positions opposite to the power generating coil block 11 within the wrist watch. Arranging the two cells 41, 42 and the power generating coil block 11 apart from each other in this manner makes it possible to position the power generating coil block having a length longer than a driving coil for efficient power generation and the cells 41, 42 which are large in size among parts of the watch separately in the either side of the winding stem 33. This ensures efficient utilization of the plane space for arranging other elements such as motor 31, the train wheel 32, the winding stem switch section which is not shown in the drawings, diode 2 which is a circuit part, and the like.

In addition, the switches 51, 52, 53 and IC chip 7 of the voltage detector circuit 6 for the power supply unit are arranged between the rotor 31*a* and the coil block 31*b* of the motor 31. This arrangement saves the space exclusively occupied by the circuit chip 7, ensuring further efficient utilization of the space. As a result, the wrist watch will not be large in size even if large size parts such as the power generating motor or the two cells, which are not assembled in common wrist watches, are arranged within the watch or a long and large coil for the driving motor is arranged in the outer periphery.

Beside the power generator consisting of the above-mentioned rotation weight, power transmission wheel, power generating coil, stator, and the like, an optical power generating unit can be used as the power generation portion 1 of the present invention. In this instance, a photoelectric transfer element is used instead of the rotation weight, power transmission wheel, power generating coil, stator, and the like. The photoelectric transfer element is assembled within the wrist watch as a character display plate or arranged below a light transmitting display plate. The use of the photoelectric transfer element which converts photo energy into electric energy as the power generation portion 1 can eliminate the rotation weight, power transmission wheel, power generating coil, stator, and the like from the wrist watch. Therefore, the wrist watch can be further miniaturized and made light-weight.

INDUSTRIAL APPLICABILITY

As illustrated above, the power supply unit for electronic appliances of the present invention is useful as a power supply unit for high precision machines such as wrist watches or a power supply unit for portable communication machines such as cellular phones.

We claim:

1. A power supply unit for an electronic appliance, comprising:

a power generator for generating electricity;

a power storage portion connected to the power generator and an electronic appliance, said power storage portion being formed of a plurality of cells having same capacities and arranged parallel to each other;

switches connected to the cells, one switch being connected to one cell in series, respectively, and one switch being arranged between the cells for connecting the cells in series;

a voltage detector circuit for detecting voltage supplied to the electronic appliance and providing signals to the switches so that arrangement of the cells is switched between a parallel connection and a series connection; and an additional cell having a capacity smaller than that of the cells, said additional cell being arranged parallel to the cells so that a switching between the parallel connection and the series connection is smoothly made while a sudden voltage change in switching is absorbed.

2. The power supply unit for an electronic appliance according to claim 1, wherein said power storage portion is formed of two cells, said two cells being arranged parallel to the additional cell.

3. The power supply unit for an electronic appliance according to claim 1, wherein said voltage detector circuit includes a delay circuit which delays the signals outputted from the voltage detector to the switches to provide off conditions momentarily for all the switches.

4. The power supply unit for an electronic appliance according to claim 3, wherein said voltage detector circuit is provided with a timing circuit which gives output signals for switching said switches when the voltage detector circuit detects a voltage higher than a standard voltage for a specified number of times.

5. The power supply unit for an electronic appliance according to claims 1, wherein said electronic appliance is an electronic wrist watch.

6. The power supply unit for an electronic appliance according to claim 5, wherein said plurality of cells are placed in a same plane with a same height in the wrist watch.

7. The power supply unit for an electronic appliance according to claim 6, wherein said plurality of cells are placed in an opposite side of a power generating coil block of the power generator.

8. The power supply unit for an electronic appliance according to claim 6, wherein said plurality of cells are two condensers with a same shape as a button-type battery and said condensers are arranged so that negative sides of the cells are located in a rotation weight side of the power generator.

9. The power supply unit for an electronic appliance according to claim 8, wherein a plus side of one of the plurality of condensers is held directly by a ground plate and the plus side of the other condenser is held by the ground plate via an insulating material.

10. The power supply unit for an electronic appliance according to claim 5, wherein said power generator has a power generating coil block, a power generating rotor, a power generating stator, a power transmission wheel, a weight holder, and a rotation weight, and wherein the power transmission wheel, which transfers a rotational force of the rotation weight to the power generating rotor, has an elastic arm which joins a boss and an outer peripheral wheel.

* * * * *